Sept. 4, 1928.  
W. B. UFFERT  
1,683,428  
AUTOMATIC SHAFT LOCK FOR AUTOMOBILES  
Filed June 2, 1927  
2 Sheets-Sheet 1
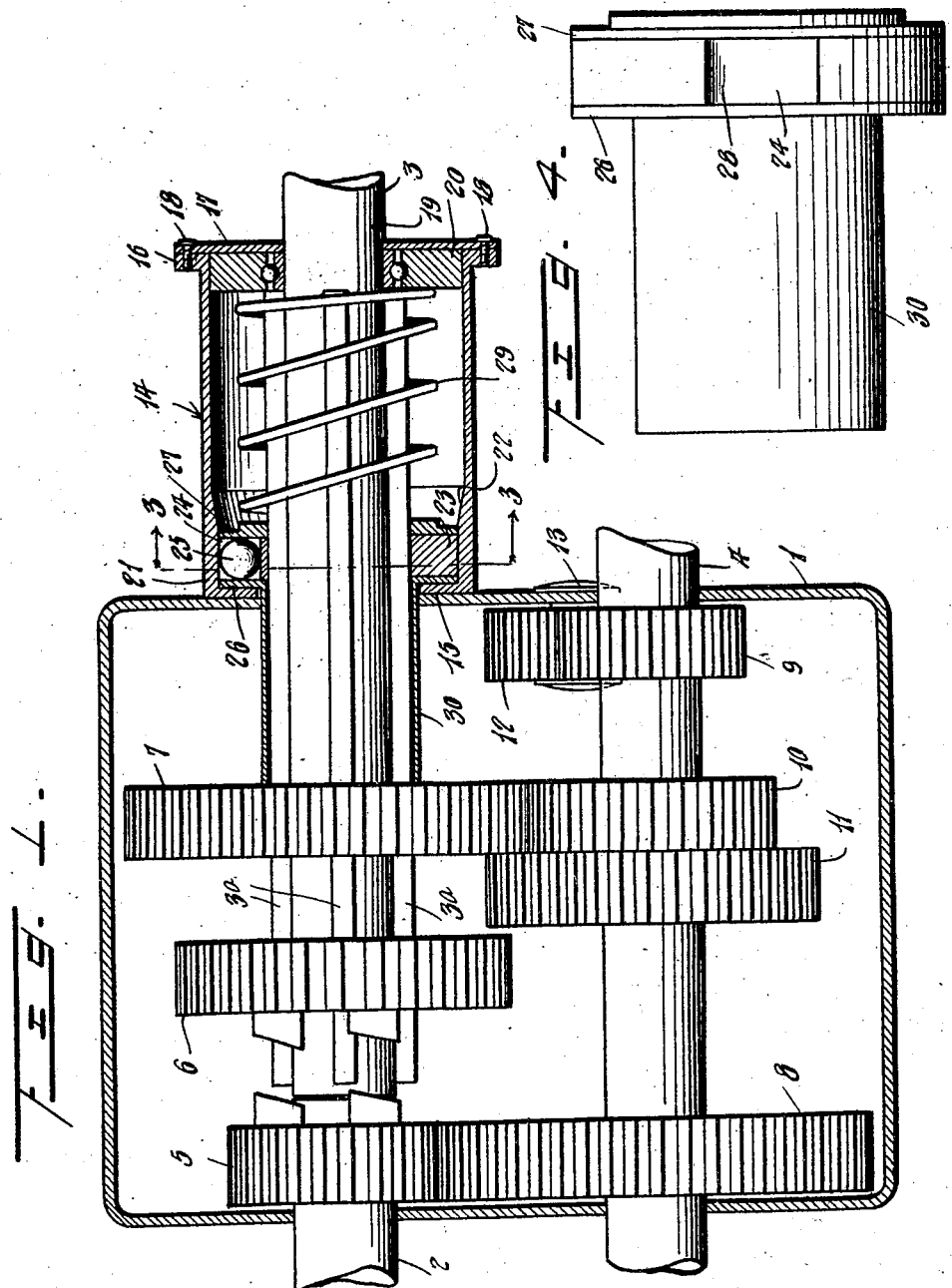
INVENTOR.  
*W. B. Uffert.*  
ATTORNEY.

Sept. 4, 1928.
W. B. UFFERT
1,683,428
AUTOMATIC SHAFT LOCK FOR AUTOMOBILES
Filed June 2, 1927   2 Sheets-Sheet 2
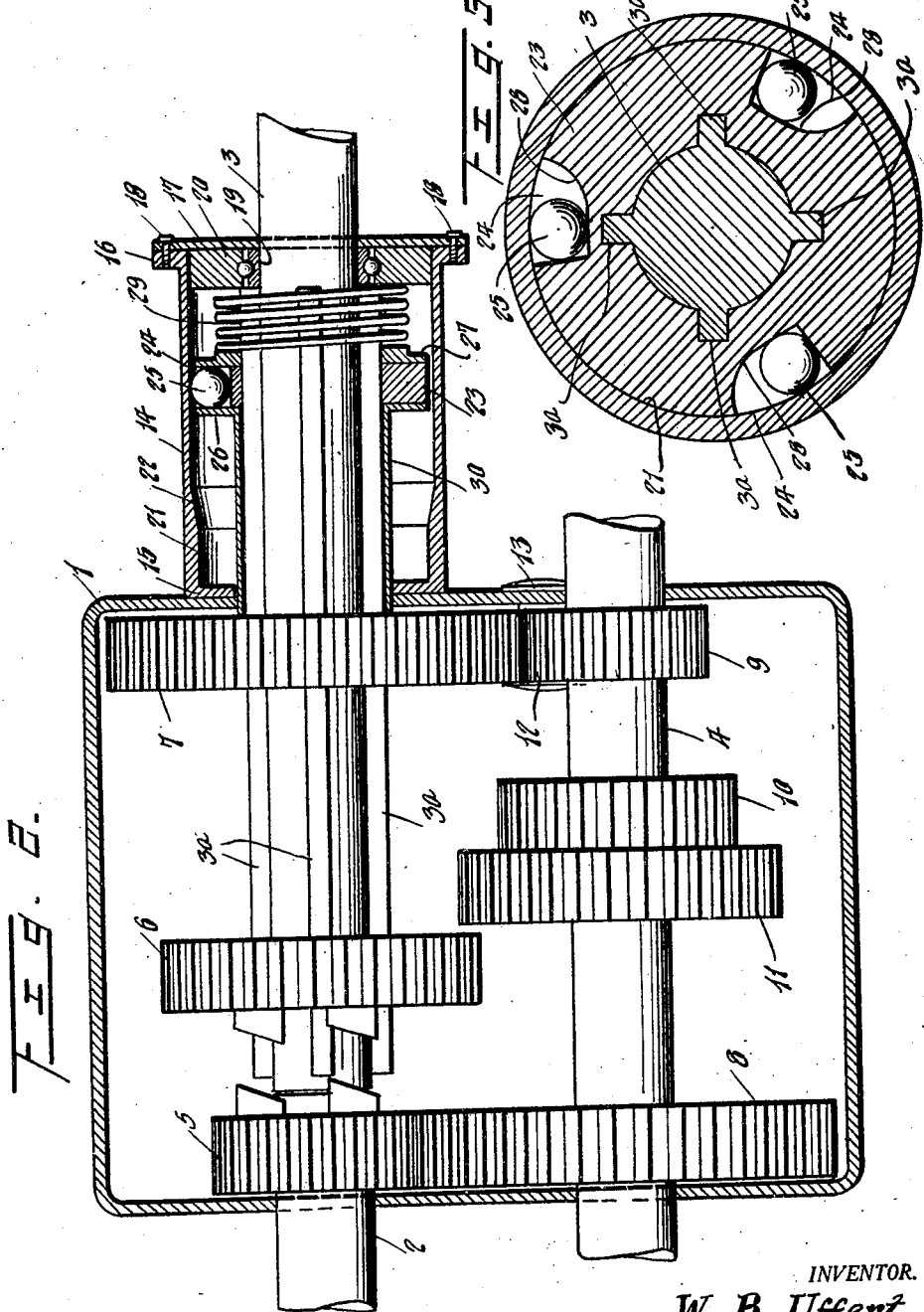
INVENTOR.
W. B. Uffert.
ATTORNEY.

Patented Sept. 4, 1928.

1,683,428

UNITED STATES PATENT OFFICE.

WALTER B. UFFERT, OF FREEPORT, NEW YORK.

AUTOMATIC SHAFT LOCK FOR AUTOMOBILES.

Application filed June 2, 1927. Serial No. 196,010.

This invention relates to improvements in the automatic shaft lock for automobiles constituting the subject-matter of my U. S. application filed May 13, 1926, serially numbered 108,836, and allowed November 15, 1926. The lock forming the subject-matter of that application is adapted to hold an automobile against casual backward movement especially when it automatically stops or is manually stopped on a hill, and said lock comprises a stationary ratchet, and a rotatable ratchet yieldingly held in engagement with the stationary ratchet and geared to the sliding gear shaft of the transmission gearing of the automobile.

The present invention has for one of its objects to improve and simplify the automatic shaft lock to the end that its rotatable ratchet may be connected directly to the sliding gear shaft of the transmission gearing.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a vertical sectional view of an automobile transmission gearing equipped with the automatic shaft lock, the gearing being shown in neutral position and the lock in active position, Figure 2 is a similar view with the gearing in reverse and the lock in inactive position, Figure 3 is a sectional view taken on the vertical plane indicated by the line 3—3 of Figure 1, and Figure 4 is a detail elevational view of the rotatable ratchet of the lock.

Referring in detail to the drawings, 1 designates the casing, 2 the clutch shaft, 3 the sliding gear shaft and 4 the counter shaft of a transmission gearing for automobiles. The clutch shaft 2 is connected to the crank shaft of the engine in the usual manner, and the sliding gear shaft 3 is connected to the propeller shaft of the automobile in the usual manner. A high speed and clutch gear 5 is carried by the clutch shaft 2. An intermediate speed and clutch gear 6 and a low speed and reverse gear 7 are slidably connected to the sliding gear shaft 3 by ribs 3ª. The counter shaft 4 carries a drive gear 8, a reverse pinion 9, a low speed pinion 10 and an intermediate speed pinion 11. A reverse idle gear 12 meshes with the reverse gear 9 and is journaled on a stub shaft 13 carried by the casing 1. During the forward propulsion of the automobile, the sliding gear shaft 3 rotates in a clockwise direction when viewed from the front, while during the rearward or reverse propulsion of the automobile, this shaft rotates in the reverse or counter-clockwise direction. As the transmission gearing is of well known construction a further description thereof is deemed unnecessary.

The means adapted to hold the automobile against casual backward movement, comprises a cylindrical casing 14 which is secured to the rear side of the casing 1 about the rear end portion of the sliding gear shaft 3. The casing 14 is provided at its front end with an inner annular flange 15 through the medium of which it may be bolted or otherwise secured to the casing 1. The casing 14 is provided at its rear end with an outer annular flange 16, and this end thereof is closed by a plate 17 which is secured to this flange by cap screws 18 and which is provided with an opening 19 for the reception of the sliding gear shaft 3. A bearing 20 for the sliding gear shaft 3 is suitably secured within the outer end of the casing 14. The inner end portion of the casing 14 is of increased thickness to provide an annular ratchet face 21 which extends inwardly beyond the inner surface of the casing 14 and which is connected to said surface by an outwardly and rearwardly inclined conical portion 22. The casing 14 and its ratchet face 21 constitutes a stationary ratchet of the lock, and this ratchet is secured to the transmission gearing casing 1 and surrounds the sliding gear shaft 3 of the transmission gearing.

The rotatable ratchet of the lock comprises a disk 23 which is located within the casing 14 and is slidably fixed to the sliding gear shaft 3 through the medium of the ribs 3ª. The disk 23 is provided with recesses 24 which open out through the periphery and through the front and rear sides thereof. Balls 25 are mounted in the recesses 24 for circumferential and radial movements with respect to the disk 23, and are held against forward and rearward movement with respect to the disk by annular plates 26 and 27 which are secured to the front and rear sides of the disk in position to close the corresponding sides of the recesses. The bottom walls 28 of the recesses 24 are inclined in a direction to force the balls 25 radially outward with respect to the disk 23 when the disk is rotated in a counter-clockwise direction and to cause the balls to travel radially inward with respect to the disk when it is rotated in a clockwise direction. When in said first or their active position the balls 25 project radially beyond the disk 23 and contact with the clutch face 21. When in the second or their inactive position, the balls 25 are located wholly within the disk 23. The disk 23 is yieldingly retained within the ratchet face 21 by a coil spring 29 which is mounted on the sliding gear shaft 3 between the disk and the bearing 20, the movement of the disk under the influence of the spring being limited by the casing flange 15. The disk 23 is provided with a forwardly projecting sleeve 30 which surrounds the sliding gear shaft 3 and its ribs 3ª and contacts with the rear side of the low speed and reverse gear 7.

When the automobile is at rest with its transmission gearing in neutral or any forward driving speed, and when the automobile is in motion during any forward driving speed, the spring 29 yieldingly maintains the rotatable ratchet, which consists of the disk 23 and the balls 25, in operative position with respect to the stationary ratchet, which consists of the annular ratchet face 21. During the forward motion of the automobile, the balls 25 will occupy their inactive position, and due thereto the lock will not in any way interfere with the propulsion of the automobile. The disk 23, the balls 25, and the plates 26 and 27 are out of contact with the stationary ratchet 21, and due thereto no part of the lock will be subjected to wear or damage during the forward propulsion of the automobile. Should, however, the automobile automatically stop or be brought manually to a stop on a hill, the rotatable ratchet 23 will interlock with the stationary ratchet 21, during the initial phase of the backward or counter-clockwise rotation of the sliding gear shaft 3 as the result of the backward movement of the automobile down the hill. When the automobile is again set in motion in a forward direction, the rotatable clutch 23 will become disengaged from the stationary clutch 21.

The provision of the rotatable clutch 23 with the sleeve 30 and the arrangement of this sleeve for contact with the low speed and reverse gear 7, causes this ratchet to be moved into inoperative position with respect to the stationary ratchet during the movement of this gear into engagement with the reverse idle gear 12. The rotatable ratchet 23 will when in this position permit the automobile to be rearwardly propelled, and is moved into this position against the tension of the spring 29. When the low speed and reverse gear 7 is moved into neutral position or into engagement with the low speed pinion 10, the spring 29 will react and return the rotatable ratchet 23 to its active position with respect to the stationary ratchet 21. The inclined portion 22 of the casing 14 which connects the stationary ratchet 21 with the inner surface of the casing, prevents the balls 25 from interfering with the movement of the rotatable ratchet 23 into its active position under the influence of the spring 29.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. In combination, a transmission gearing including a sliding gear shaft and gears slidably associated with said shaft, a stationary ratchet, a rotatable ratchet slidably fixed to said shaft and under the control of one of said gears, and means yieldingly holding the rotatable ratchet in operative position with respect to the stationary ratchet.

2. In combination, a transmission gearing including a sliding gear shaft and gears slidably associated with said shaft, a stationary ratchet, a rotatable ratchet slidably fixed to said shaft and provided with an extension contacting with one of said gears, and means yieldingly holding the rotatable ratchet in operative position with respect to the stationary ratchet.

3. In combination, a transmission gearing including a sliding gear shaft and gears slidably associated with said shaft, a stationary ratchet, a rotatable ratchet slidably fixed to said shaft, a sleeve surrounding said shaft and connected to the rotatable ratchet and contacting with one of said gears, and means yieldingly holding the rotatable ratchet in operative position with respect to the stationary ratchet.

4. In combination, a transmission gearing including a casing, a sliding gear shaft and gears slidably associated with said shaft, a second casing surrounding said shaft and fixed to the first casing, said second casing having an annular ratchet surface surrounding said shaft, a disk slidably fixed to said shaft and provided with recesses opening out through the periphery thereof, balls mounted in the recesses of the disk, a sleeve carried by the disk and surrounding said shaft and contacting with one of said gears, and a spring surrounding said shaft and bearing against the disk.

5. In combination, a transmission gearing including a sliding gear shaft and gears slidably associated with said shaft, a stationary casing surrounding said shaft and provided on the interior thereof with an annular ratchet surface extending inwardly beyond the inner surface thereof, said casing being provided on the interior thereof with an inclined portion extending from said ratchet surface to the inner surface of the casing, a bearing for said shaft and carried by the casing, a disk slidably fixed to said shaft and provided with recesses opening out through the periphery thereof, balls mounted in the recesses, a sleeve carried by the disk and surrounding said shaft and contacting with one of said gears, and a coil spring mounted on said shaft between the disk and bearing.

6. In combination, a transmission mechanism including means by which it may be placed in neutral or set for forward or reverse drive, and means associated with the driven shaft and under the control of said first means for holding said shaft against reverse rotation when the mechanism is in neutral or set for forward drive.

7. In combination, a transmission mechanism including means by which it may be placed in neutral or set for forward or reverse drive, a fixed ratchet, a rotatable ratchet carried by the driven shaft for movement into and out of operative position with respect to the fixed ratchet, and means under the control of said first means for holding the rotatable ratchet in operative position when the mechanism is in neutral or set for forward drive and for holding said ratchet in inoperative position when the mechanism is set for reverse drive.

8. In combination, a transmission mechanism including means by which it may be placed in neutral or set for forward or reverse drive, a fixed member, a rotatable member carried by the driven shaft for movement into and out of operative position with respect to the fixed member and adapted when in operative position to hold the driven shaft against reverse movement, and means under the control of said first means for holding the rotatable member in operative position when the mechanism is in neutral or set for forward drive.

9. In combination, a transmission mechanism including means by which it may be placed in neutral or set for forward or reverse drive, a fixed member, a rotatable member carried by the driven shaft for movement into and out of operative position with respect to the fixed member and adapted when in operative position to hold the driven shaft against reverse movement, and means under the control of said first means for holding the rotatable member in operative position when the mechanism is in neutral or set for forward drive, and for holding said member in inoperative position when the mechanism is set for reverse drive.

In testimony whereof I affix my signature.

WALTER B. UFFERT.